United States Patent [19]

Connolly

[11] Patent Number: 4,710,296
[45] Date of Patent: Dec. 1, 1987

[54] STATIC SIEVE FEED CONTROL

[76] Inventor: James D. Connolly, P.O. Box 5329, Princeton, W. Va. 24740

[21] Appl. No.: 903,560

[22] Filed: Sep. 4, 1986

[51] Int. Cl.[4] .............................................. B01D 25/04
[52] U.S. Cl. ..................................... 210/420; 209/17; 209/253; 209/273; 209/281; 210/456; 210/483; 210/495; 210/498; 210/499
[58] Field of Search ............... 209/274, 281, 233, 243, 209/363, 253, 17, 268, 18, 273; 210/433.1, 420, 455, 456, 409, 483, 495, 498, 499

[56] References Cited
U.S. PATENT DOCUMENTS 3,007,574  11/1961  De Koning ........................ 209/281
3,363,769  1/1968  Wilmot et al. .................. 210/433.1

FOREIGN PATENT DOCUMENTS 128815  7/1959  U.S.S.R. .............................. 209/274

Primary Examiner—Frank Sever
Attorney, Agent, or Firm—Wilmer Mechlin

[57] ABSTRACT

In a static sieve assembly having a housing for mounting a sieve or screen, a feed box having a discharge spout for feeding material tangentially to and across the sieve, a side of the spout having flexibly connected fixed upper and movable lower parts, and an actuator on said feed box and acting on said lower part for controlling the rate of feed to the sieve by varying the area of a discharge opening of the spout.

6 Claims, 4 Drawing Figures

4,710,296

STATIC SIEVE FEED CONTROL

BACKGROUND OF THE INVENTION

In using static sieves, sieve bends or screens formed of laterally spaced wedge-shaped screen wires backed by and welded to normally or right angularly related laterally spaced tie rods, for deliquifying and/or classifying slurries or other solid-liquid mixtures, it is common practice, as in Leeman U.S. Pat. No. 3,344,919, to mount a flat or concave sieve, screen or sieve bend in a housing or holder having counterpart ends and reversible end-for-end for alternating the ends of the sieve bend presented for feeding. It also is common practice, as in the U.S. Pat. Nos. 3,363,769 to Wilmont and 3,452,876, to Ginaven, have the sieve or screen slope downwardly from its feed end and to feed the mixture as a sheet tangentially onto the sieve from an overlying feed box through a discharge opening extending the width of the sieve. In some prior assemblies provision is made for adjusting the area of the discharge opening. Thus, there is automatic adjustment in Wilmot to accommodate oversize particles, while Ginaven controls the rate of feed to the sieve by a vertically shiftable control plate. The present invention is primarily concerned with an improvement in adjustable discharge openings of feed boxes.

SUMMARY OF THE INVENTION

The primary object of the present invention is to provide in a static sieve assembly having a housing and a feed box for feeding a solid-liquid mixture onto a sieve in the housing, an improved device for controlling the rate of discharge of said mixture from said box to said sieve.

Another object of the invention is to provide in a static sieve assembly having a housing for a sieve and a feed box for feeding a solid-liquid mixture onto said sieve, the housing having counterpart ends and being angleably and rotatably mounted for selectively reversing the feed end of said sieve, and the feed box having a discharge spout for feeding said mixture tangentially onto and across the selected feed end of said sieve, wherein a side of said spout has a fixed upper part and a lower part flexibly connected thereto, and means acting on said lower part for adjusting the area of a discharge opening of said spout and the rate of discharge therethrough.

An additional object of the invention is to provide in a static sieve assembly improved means for selectively adjusting the flow rate of a solid-liquid mixture through a discharge spout of a feed box, the adjusting means including on a side of said spout upper fixed and lower movable plates fixed to and flexibly connected by an elastomeric member, and disc means mounted for eccentric rotation on said box and acting through said lower plate for adjusting the area of the discharge opening of said spout.

A further object of the invention is to provide in a static sieve assembly according to the immediately preceding object, wherein the disc means are eccentrically mounted on a shaft rotatably mounted on the feed box, a bar fixed against rotation to and swingable in a limited arc on said shaft for varying the spacing between said liner and fixed side, and means operative at a selected spacing for locking the bar against swinging.

The foregoing and other objects and advantages of the invention will appear hereinafter in the detailed description, be particularly pointed out in the appended claims and be illustrated in the accompanying drawings, in which:

FIGURE DESCRIPTION

DETAILED DESCRIPTION

Figure 1:
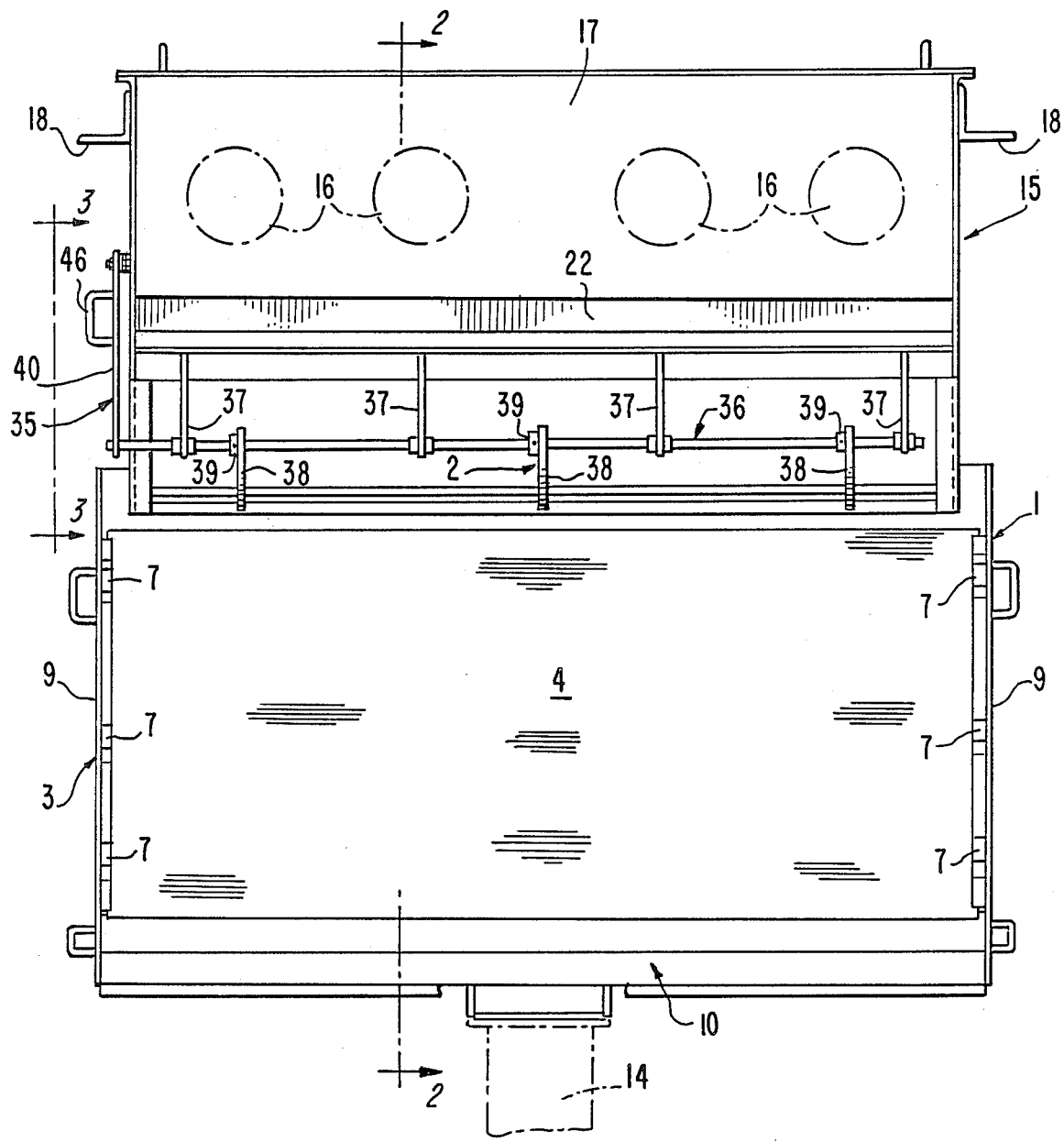
FIG. 1 is a front elevational view of a static sieve assembly incorporating a preferred embodiment of the device of the present invention for controlling the feed rate of a solid-liquid mixture from a feed box to a sieve bend.
Figure 2:
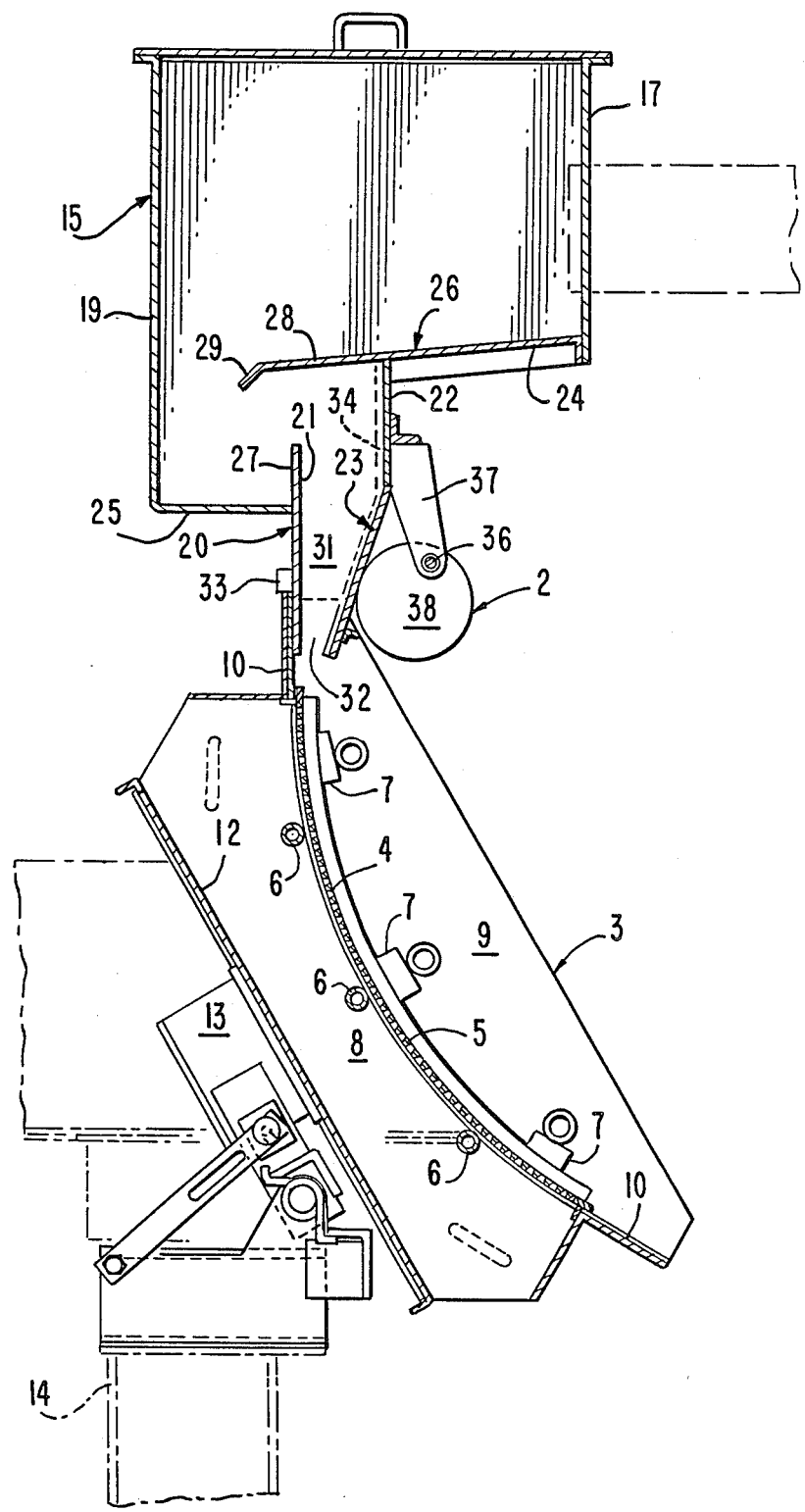
FIG. 2 is a vertical sectional view taken along the lines 2—2 of FIG. 1.
Figure 3:
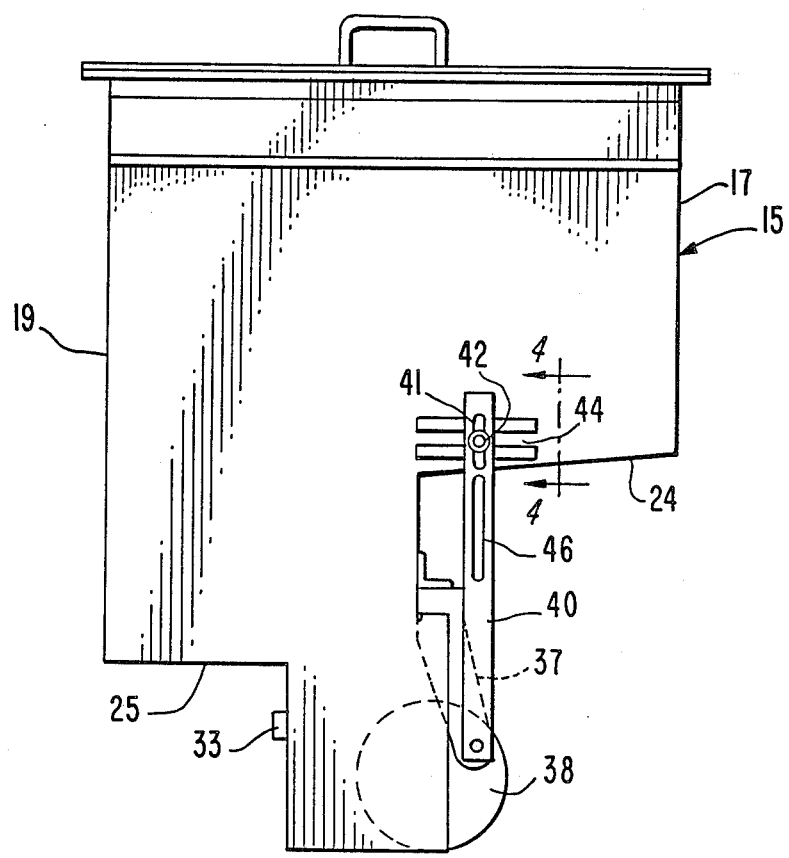
FIG. 3 is a side elevational view of the feed box taken along the lines 3—3 of FIG. 1.
Figure 4:
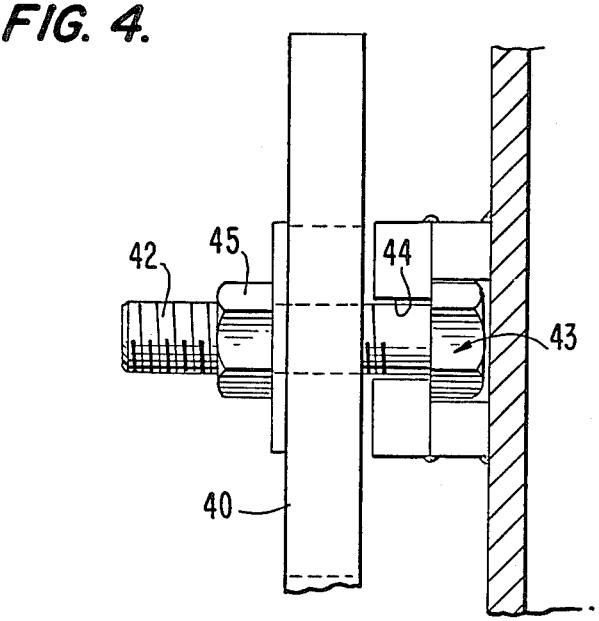
FIG. 4 is a fragmentary side elevational view taken along lines 4—4 of FIG. 3.

Referring now in detail to the drawings in which like reference characters designate like parts, the improved feed control device of the present invention is particularly designed for use in a static sieve assembly for controlling the rate of discharge or feed of a slurry or other solid-liquid mixture from a feed box to a static sieve or screen.

Designated as 1, the static sieve assembly illustrated as exemplary of a suitable installation of the improved feed control device 2, is comprised of a housing or holder 3 containing, holding or housing a sieve, screen or sieve bend 4. Flat or, as illustrated, concave, the preferred screen 4 suitably is of the type illustrated in Connolly U.S. Pat. No. 4,512,880, in which the screen's screening or upper deck or surface 5 is formed by bases of transversely extending, laterally spaced wedge-shaped screen wires, backed by and welded to longitudinally extending, laterally spaced tie bars. In the housing 3 the screen 4 is supported intermediate its ends on cross bars 6 and conveniently is removably held in operative, longitudinally downsloping position by being clamped at sides or edges to the housing by a plurality of wedges.

The housing 3 laterally contains the screen 4 and a drain compartment or chamber 8 beneath the screen between side plates or sides 9 and has at opposite ends of the screen suitably imperforate and removable duplicate alternately feed and discharge plates or lips 10. As is the housing 3 as a whole, the compartment 8 is counterpart about its longitudinal centerline with openings 11 at both ends for alternately discharging liquid and undersize particles separated from a solid-liquid mixture. With its counterpart construction, the housing is suited to reversing the end of the screen presented for feeding when the presented end becomes worn, and is adapted for such reversal by having its base or bottom 12 centrally connected for relative rotation and limited horizontal tilting or angling to a head 13 of a pedestal 14. As in the illustrated assembly 1, the housing 3 and screen 4 in either operative position suitably may be tilted at an angle of 60 degrees to the horizontal and the screen swung through a 60 degree arc on a 40 inch radius.

The solid-liquid mixture to be deliquified and/or classified by the screen 4, is fed thereto from an overlying feed box 15. Generally box-shaped, the preferred feed box 15 is itself fed with the mixture through an inlet opening or openings 16 in a side wall, conveniently its front wall 17, by feed pipe or pipes 17. The illustrated feed box is adapted to be supported separately from the housing 3, suitably on fixed beams (not shown) underlying external angle irons 18 on its sides. However, whether separate from or mounted on the housing 3, the feed box 15 is designed to feed, deliver or discharge the solid-liquid mixture onto the screen 4, preferably tangentially, as a feed-rate regulated or controlled thin stream or sheet extending substantially across or coterminous in width with the screen. To accomplish this, the feed box 15, intermediate its conveniently upright or vertically disposed parallel front and rear walls 17 and 19, has a depending feed or discharge spout or chute 20, a rear wall 21 and upper part 22 of a front wall 23 of which suitably are fixed and parallel to each other and the walls 17 and 19.

Spaced or interrupted by the discharge spout 20, the front and rear parts 24 and 25 of the feed box's bottom wall 26 are relatively vertically staggered, with the rear part the lower. The same downwardly offset relation obtains between the upper ends of the spout's front and rear walls 23 and 25, that of the rear wall being the lower, although still higher than or projecting above the rear part 25 of the bottom wall 26 to form a dam 27. The front part 24 of the bottom wall 26 has a rearward extension a shelf or ledge 28 which overlaps the upper end of the spout 20 and ends at the rear, forwardly of the box's rear wall 19, in a downturned lip or flange 29.

By contrast with the upper part 22, the lower part 30 of the spout's front wall 23, downwardly or in a downward direction, slopes inwardly toward its rear wall 21 to form therewith a downwardly tapering hopper-like passage or duct 31 leading to a rectangular, laterally elongated feed or discharge opening or port 32. In either operative or screening position of the housing 3, the feed plate 10 at the then presented end of the screen 4 engages or seats against the back of the fixed or rigid rear wall 21 of the discharge spout 20 below a stop or abutment 33 thereon and aligns that wall vertically with the screen's adjoining end portion. With the spout 20 substantially as wide as or coterminous in width with the screen 3, any solid-liquid mixture discharged from the feed box 15 through the spout 20, will be discharged tangentially onto and across the screen 4 as a wide relatively thin stream or sheet.

While the disposition of the spout's rear wall 21 in alignment with the presented end of the screen 3 is responsible for feeding or directing the mixture tangentially onto the screen, in the assembly of this invention it is the the front wall 23 that, as part of the improved feed control device 2, enables the rate and form of the feed to be controlled or determined by selective adjustment of the area or width of the discharge opening 32 of the spout 20 within a suitable range. To accomplish this, the spout's front wall 23 has for its upper and lower parts 22 and 30 separate, suitably rigid plates, the upper fixed and upright and the lower sloping inwardly and downwardly toward the rear wall 21. The plates back or are backed and flexibly connected for horizontal hinging or swinging of the lower relative to the upper, by a polyurethane or other elastomeric or resilient liner, facing or backing 34 facing away from or, as illustrated, toward or confronting the rear wall 21.

Adjusting means or mechanism 35 of the improved feed control device 2, is adapted to act on or cooperate or interact with the spout's front wall 23 for adjusting the area of the discharge opening 32. The adjusting means 35 includes a shaft 36 mounted or journaled for rotation about a horizontal axis parallel to and spaced forwardly and within the vertical limits of of the lower backing plate 30, on a plurality of laterally spaced struts or brackets 37 fixed to and projecting forwardly and downwardly from the fixed upper backing plate 22. On the shaft 36 are eccentrically and non-rotatably mounted a plurality of discs 38, each conveniently between an adjoining pair of the struts 37, and fixed against rotation relative to the shaft, as by fixing to a side of each a hub 39 set-screw lockable or fixable to the shaft.

Normally abutting, engaging or acting against the lower plate 30, the discs 38 act through that plate either positively for narrowing the discharge opening 32 or negatively for resisting widening of the opening under the force of mixture discharging therethrough. Whether the discs' action is positive or negative, the width of the opening 32 in terms of the spacing between the spout's front and rear walls 23 and 21, is varied by turning the shaft 36 and thereby the discs, and the shaft itself is turned by an adjusting lever or bar 40 fixed to one or each end. The lever 40 is swingable through an arc sufficient to vary the width of the discharge opening 32 over the desired range, which suitably may be from 1 to 3 inches (2.54 to 7.62 cm). For locking or clamping it in position to preselect or predetermine the opening's width within that range, the lever 40 carries or mounts in a longitudinally elongated slot 41 in its upper or distal end portion above the level of the bottom of the feed box 15, a clamping bolt 42 having a head 43 riding in a horizontal slide track 44 on an adjoining side of the feed box and a nut 45 on its end portion projecting outwardly through the lever. A handle 46 on the lever 40 facilitates its swinging to selected position on loosening of the nut 45.

In operating the assembly 1, the screen 4 is positioned relative to the feed box to be fed, preferably tangentially, and the discharge opening 32 set at the width or area by the adjusting device 35. The slurry or other solid-liquid mixture to be screened is then introduced into the feed box 15 through the one or more inlet openings 16 in its front wall 17. Barred from direct access to the spout 20 by the interposed shelf 28 and dam 27. The mixture flows backwards along the shelf past the spout, falls over the shelf's lip 29 and to the lower rear part 25 of the box's bottom wall 26 back of the dam. On overflowing the dam, the solid-liquid mixture enters the spout 20 for discharge therefrom through the opening 32 onto and across the screen 4 as a wide relatively thin laminar stream or sheet at a feed rate predetermined or preselected by the setting of the control device 2.

From the above detailed description it will be apparent that there has been provided an improved device for controlling the feed rate of a solid-liquid mixture from a feed box to a screen or sieve bend in which a discharge spout of the feed box has as one wall a lower part elastomerically connected for relative horizontal swinging to an upper part and adjusting means acting on the lower part enable the discharge rate from the spout to be predetermined.

It should be understood that the described and disclosed embodiment is merely exemplary of the invention and that all modifications are intended to be included that do not depart from the spirit of the invention and the scope of the appended claims.

Having now described my invention, I claim:

1. In a static sieve assembly, the combination with a housing mounting a screen and a feed box for feeding a solid-liquid mixture to the screen, of a feed control device for controlling the rate of discharge of said mixture from said box to said sieve comprising a discharge spout on said feed box for discharging said mixture therefrom onto and across said screen, said spout having front and rear walls together bounding opposite sides of a passage tapering downwardly to a discharge outlet, said front wall having a lower part, elastomeric means connecting said parts for relative horizontal angling, and means mounted on said feed box and acting on said lower part for selectively adjusting the cross-sectional area of said outlet between said walls.

2. A feed control device according to claim 1, wherein the upper and lower front wall parts are plates connected for relative angling by elastomeric means.

3. A feed control device according to claim 2, wherein the adjusting means include a horizontal shaft rotatably mounted on the feed box, and disc means eccentrically and non-rotatably mounted on said shaft and acting against said front wall lower part, said disc means on rotation of said shaft acting through said lower part for varying the width of said discharge opening.

4. A feed control device according to claim 3, including lever means non-rotatably mounted on said shaft for therethrough turning said disc means against said lower part.

5. A feed control device according to claim 4, wherein the lever means is swingable through a predetermined arc for correspondingly predetermining the range of variation in the width of the discharge opening, and including means carried by a distal end portion of said lever and engageable with track means on the feed box for clamping said lever in a selected position within said arc.

6. A feed control device according to claim 5, wherein the lever means is swingable in a substantially vertical plane.

* * * * *